Feb. 7, 1967   J. L. GIOVINAZZO   3,302,941
AUXILIARY SPRING FOR AUTOMOTIVE VEHICLES
Filed Oct. 19, 1965   2 Sheets-Sheet 1
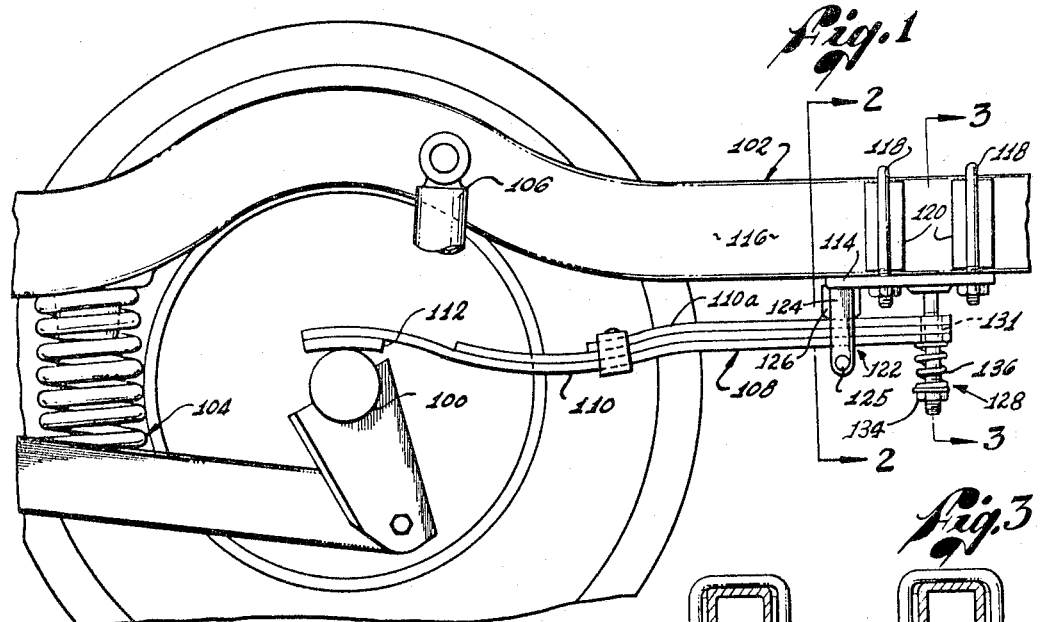
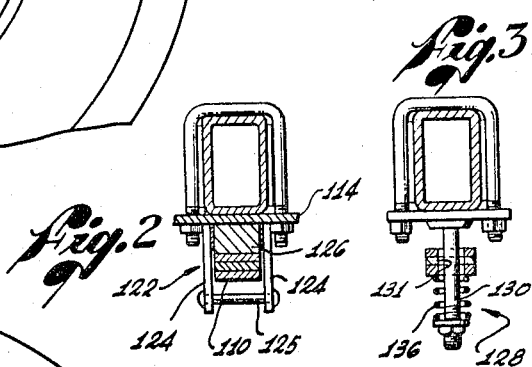
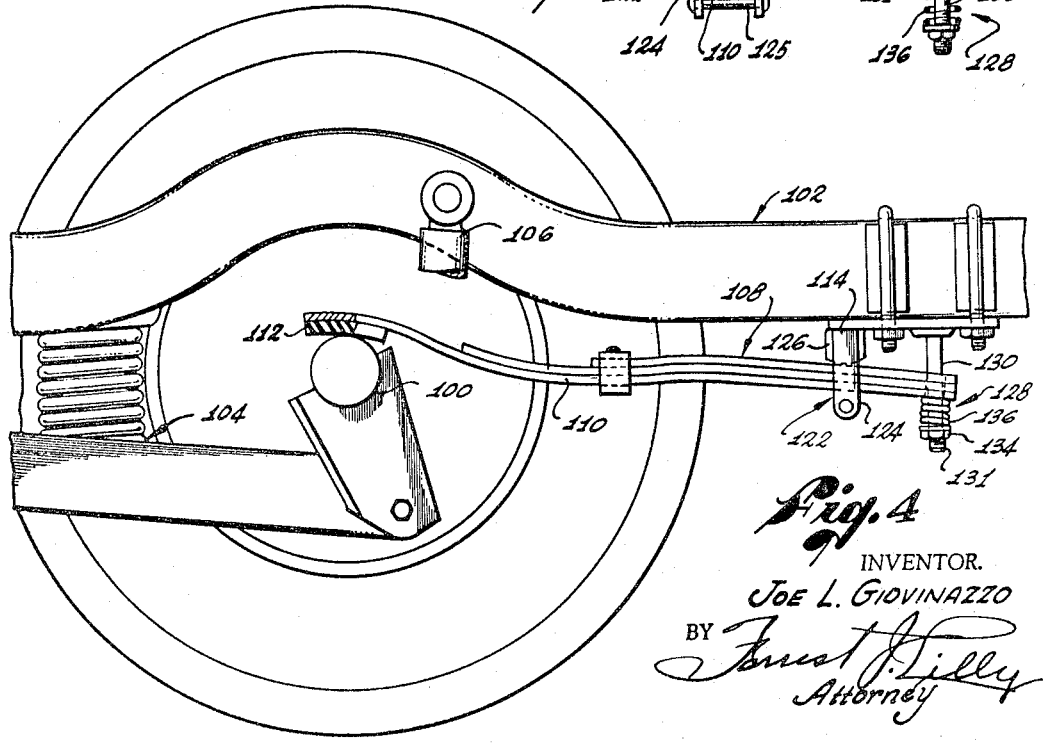
INVENTOR.
JOE L. GIOVINAZZO
BY *Forrest J. Lilly*
Attorney Feb. 7, 1967   J. L. GIOVINAZZO   3,302,941
AUXILIARY SPRING FOR AUTOMOTIVE VEHICLES
Filed Oct. 19, 1965   2 Sheets-Sheet 2
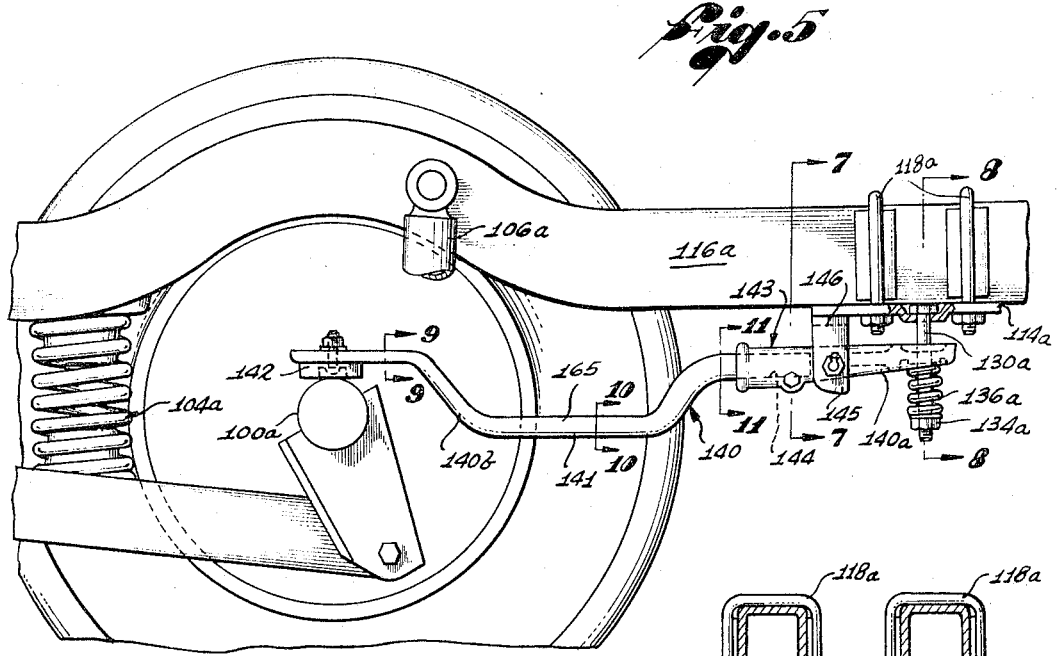
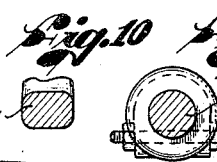
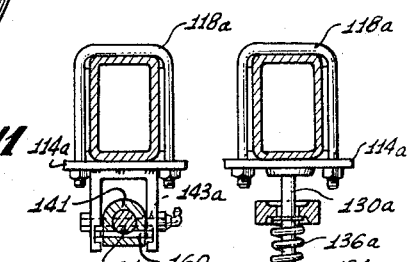
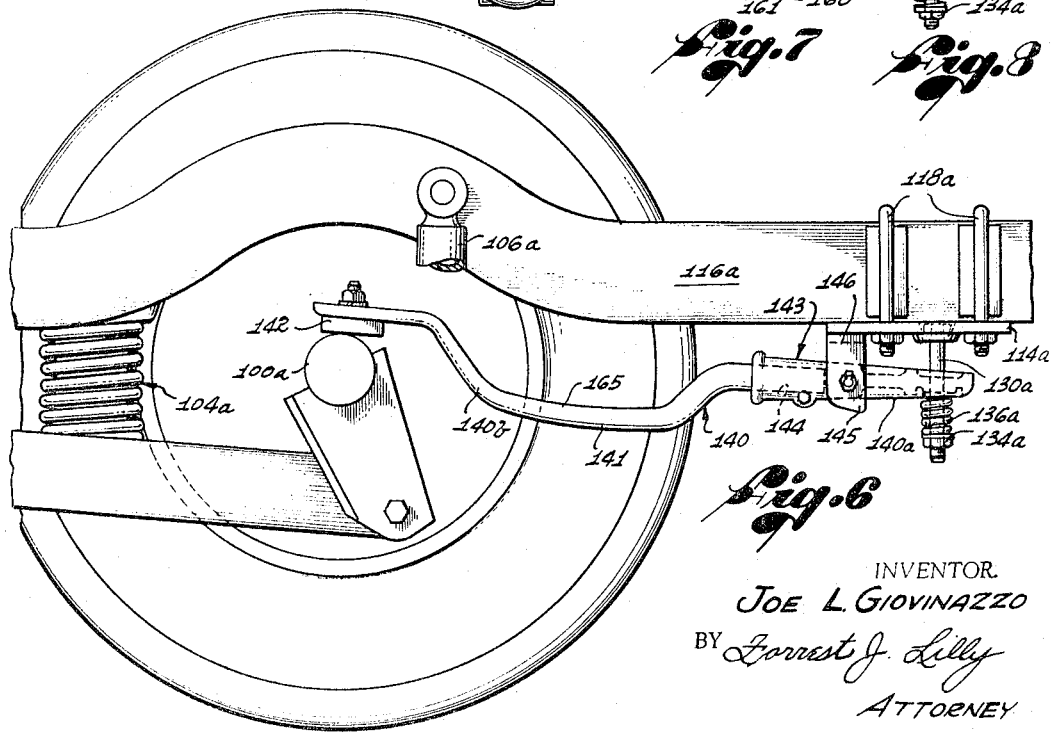
INVENTOR.
JOE L. GIOVINAZZO
BY Forrest J. Lilly
ATTORNEY – # United States Patent Office 3,302,941
Patented Feb. 7, 1967

---

3,302,941
AUXILIARY SPRING FOR AUTOMOTIVE VEHICLES
Joe L. Giovinazzo, Los Angeles, Calif., assignor to Cambria Spring Company, Los Angeles, Calif., a corporation of California
Filed Oct. 19, 1965, Ser. No. 505,580
4 Claims. (Cl. 267—17)

This application is a continuation-in-part of my co-pending application Serial No. 412,420 filed November 19, 1964, now abandoned, for Auxiliary Spring for Automotive Vehicles, which was a division of my original application Serial No. 100,946 filed April 5, 1961, now Patent No. 3,168,300 issued February 2, 1965.

This invention relates generally to spring suspension systems for automotive vehicles and the like and, more particularly, to an auxiliary helper or overload spring for such suspension systems.

As is well known in the art, spring suspension systems for automotive vehicles are designed for a particular load or load range. The modern trend, particularly in passenger vehicles, is to "soft" springing, for a comfortable ride; and the springs may be designed for a "soft" ride for an assumed maximum load of from two to four passengers. The spring suspension may then be inadequate for loading beyond such maximum. Thus, the greater the loading, or the designed or intended load-carrying capacity of a vehicle, the greater must be the stiffness of the spring suspension system of the vehicle.

In many instances, it is desirable and necessary to use a vehicle with soft springing for transporting loads which are appreciably heavier than the design load of the vehicle's spring suspension system. This occurs most frequently in the case of light trucks, station wagons and passenger vehicles. The springs of a vehicle are excessively deflected under such increased loads, with the result that the chassis is prone to striking the rear axle of the vehicle. In cases of extreme overloading, the vehicle springs may be deflected to such a degree that the chassis of the vehicle rests directly on the axle.

Various types of auxiliary springs have been devised for reinforcing the spring suspension system of an automotive vehicle so as to enable the latter to carry additional loads. The existing auxiliary springs, however, possess certain deficiencies which are overcome by the present auxiliary spring.

Perhaps the most serious defect of the existing auxiliary springs resides in the fact that the vehicles on which auxiliary springs are most frequently used, namely, light trucks, station wagons and passenger vehicles, carry excessive loads only occasionally. The existing auxiliary springs, while capable of supporting these excessive loads, exert their reinforcing action on the spring suspension systems of the vehicles at all times, even when the vehicles are transporting only normal loads. As a result, vehicles equipped with the existing auxiliary springs have extremely hard rides under normal load conditions. It has also been proposed in the past to provide an auxiliary spring which increases its helper action progressively with increased loading. However, even this device exerts some initial stiffening, and hence some of the soft ride qualities of the initial springing are sacrificed.

Further, in most cases, a pair of auxiliary springs, one at each end of the rear axle, is used. It is highly desirable that these two auxiliary springs be individually adjustable in order to enable them to be equalized or to permit compensation to be made for unbalance in the vehicle spring suspension system itself. Most of the existing auxiliary springs are incapable of adjustment in this manner.

Other deficiencies of the existing auxiliary springs reside in their relatively complex construction, high cost of manufacture, and their difficulty of installation requiring, in most cases, the services of a skilled mechanic.

With the foregoing preliminary discussion in mind, a broad object of the present invention is to provide an auxiliary spring of the character described which avoids the above noted and other deficiencies of existing auxiliary springs.

A particular and primary object is to provide an auxiliary helper spring which under normal conditions of use does not disturb the normal-load ride characteristics of the vehicle, and which comes into effective play only when the vehicle has been overloaded.

Another object of the invention is to provide an auxiliary spring of the character described which is quickly and easily adjustable to vary its reinforcing effect on the spring suspension system of the vehicle on which it is installed.

Another object of the invention is to provide an auxiliary spring of the character described which can be used to level an automotive vehicle whose springs are out of balance.

The invention will be better understood from the following detailed description of two illustrative embodiments thereof, taken in connection with the annexed drawings, wherein:

FIG. 1 is a side elevational view of an embodiment of the invention;
FIG. 2 is a section taken along line 2—2 of FIG. 1;
FIG. 3 is a section taken along line 3—3 of FIG. 1;
FIG. 4 illustrates the device of FIG. 1 under increased loading;
FIG. 5 is a view similar to FIG. 1 but showing a modification;
FIG. 6 is a view similar to FIG. 5, but showing the vehicle loaded to the point of bringing the auxiliary spring into play;
FIG. 7 is a transverse section taken on line 7—7 of FIG. 5;
FIG. 8 is a transverse section taken on line 8—8 of FIG. 5;
FIG. 9 is a transverse section taken on line 9—9 of FIG. 5;
FIG. 10 is a transverse section taken on line 10—10 of FIG. 5; and
FIG. 11 is a transverse section taken on line 11—11 of FIG. 5.

Reference is now made to FIGS. 1-4 illustrating one embodiment of the present auxiliary spring. In these figures, the numeral 100 denotes the rear axle of an automotive vehicle and the numeral 102 denotes the frame. Frame 102 is supported on axle 100 by a main coil spring suspension system generally designated by the numeral 104. A shock absorber 106, only partially illustrated, may be connected between each end of the axle and the frame 102.

The auxiliary spring 108 may comprise only one spring leaf 110 or a plurality of spring leaves 110a, as illustrated, depending on the auxiliary spring action required. It may also embody an elongated rod or bar, as in an embodiment to be described later. One end of spring leaf 110, the free end, mounts a resilient pad 112 which seats against the top side of the rear axle 100, or is otherwise connected thereto.

The other end of the auxiliary spring is mounted on the frame 102 of the vehicle, as follows: Indicated at 114 is a mounting plate which seats against and is secured to the underside of a side member 116 of frame 102 by U-bolts 118. Blocks 120 of wood or other cushioning material may be placed between the U-bolts and frame member 116, as shown.

Indicated generally at 122 is a pivot or fulcrum means for pivotally supporting an intermediate portion of the auxiliary spring 108 on the supporting plate 114, it being noted that the spring 108 is in the nature of a lever with two arms extending oppositely from the pivot means 122. The pivot means 122 comprise a pair of downwardly depending members 124 which are welded at their upper ends to the mounting plate 114. The lower ends of these members are joined by a rivet 125. Fixed to the mounting plate 114 and disposed between the upper ends of the members 124 is a fulcrum or pivot block 126. The spring leaves 110a pass between the members 124 of the pivot means 122 and seat against the pivot block 126 at a position spaced by a relatively short lever arm distance from the extreme right-hand end of the spring. The pivot means 122, therefore, rockably supports the spring 108 for pivoting on a horizontal transverse axis.

The main vehicle spring suspension system 104 permits movement of the frame 102 and rear axle 100 toward and away from one another, and during movement of these members toward one another, the auxiliary spring 108 pivots in a clockwise direction on the pivot means 122. In effect, a clockwise force couple is exerted on the spring 108, at a relatively long lever arm distance equal to the distance between pivot or fulcrum element 126 and the axle 100. Indicated at 128, at a relatively short lever arm distance from pivot means 122, and beyond said means from axle 100, is a lost motion connection between the right-hand extremity of the auxiliary spring 108 and frame 116 which accommodates a limited range of pivotal movement of the auxiliary spring in the clockwise direction on the pivot means 122 without any material opposition and which, after a limited range of such pivotal movement, thereafter prevents free clockwise pivoting of the auxiliary spring, and causes it to bend between its pivot and the point of support by the axle. This connection, in the present illustrative embodiment, comprises a post 130 which extends downwardly from the mounting plate 114 to which it is connected. This post passes loosely through an enlarged hole 131 in the spring leaves 110a, which hole is located between the pivot means 122 and the extreme right-hand edge of the springs. A shoulder-forming nut 134 is threaded on the lower end of the post 130. Mounted on this post, between the right-hand end of the spring 108 and the nut 134, is a relatively small and light coil compression spring 136 of much lower spring rate or constant, i.e., "softer," than the auxiliary spring 108. This spring 136 actually fulfills no necessary function in the spring suspension beyond preventing looseness and rattling around of the helper spring 108, and also, when "bottomed out," as an abutment or limiting stop. It could be eliminated and the nut 134 raised a little higher until it acts as the stop.

From this description, it is evident that the coil spring 136 yieldably but lightly resists clockwise pivoting of the auxiliary spring 108 on the pivot means 122, keeping the left-hand end of the spring 108 against the axle. In other language, the coil spring 136 has such a low spring rate as compared with that of the auxiliary spring that it is easily compressed and has no material effect on the "ride." Thus the normal soft or cushioned ride under normal load conditions is fully preserved, the spring 108 exerting such light resistance to clockwise pivoting of the auxiliary spring as to have no material effect on the characteristics of the ride under normal load. Thus no helper spring influence can be noticed at this time. It is further evident, however, that when the auxiliary spring 108 has pivoted under extra loading to a limiting position such as FIG. 4, the coils of the spring 136 are in engagement with one another, i.e., the spring 136 has "bottomed out," and thus further clockwise pivoting of the auxiliary spring has been stopped. The spring 136 thus functions as a part of the abutment means which limits the pivotal movement of the auxiliary spring.

The parts of the present auxiliary spring are designed so that under normal loading of the automotive vehicle, the leaves of the auxiliary spring 108 will be unbent and the coil spring 136 will be partially compressed. As the vehicle is loaded, the axle 100 and frame 102 approach one another and thereby produce clockwise pivoting of the auxiliary spring leaves on the pivot means 126. This pivoting is lightly but unnoticeably and therefore immaterially resisted by the coil spring 136. Thus, because of the low spring rate of this coil spring with respect to that of the auxiliary spring 108, the coil spring 136 compresses easily without bending of the auxiliary spring leaves. It will be noted that the auxiliary spring acts as a lever and that the described pivoting action thereof takes place with the pivoting force or couple acting on the auxiliary spring as a result of load imposition being effective at the relatively long lever arm distance between the axle 100 and the fulcrum 126, while the short length of the spring 108 between the fulcrum 126 and the post 130 easily compresses the small and soft coil spring 136. The short lever arm and the softness of the spring 136 cause the spring 136 to compress until bottomed out before the stiff auxiliary spring 108 begins to flex materially. Thus after partial deflection of the vehicle spring suspension system 104, the coils of the coil spring 136 engage one another to prevent further pivoting of the auxiliary spring leaves on the pivot means (FIG. 4). Further movement of the axle and vehicle frame toward one another, and deflection of the vehicle suspension spring 104, due to additional loading of the vehicle, then produces bending of the spring leaves of the auxiliary spring 108, which bending reinforces the spring suspension system of the vehicle.

Thus, the auxiliary spring 108 becomes effective to reinforce the vehicle spring suspension system only after partial deflection of the system. Accordingly, under normal load conditions, the vehicle is afforded with a soft ride and the auxiliary spring does not become effective. With overload, however, a preliminary deflection of the springs of the vehicle is then followed by reinforced stiffness as the auxiliary springs come into play by delayed action.

FIGS. 5 to 11 show a modified form of the invention wherein the leaf type spring of FIGS. 1–4 is replaced by a more modern and advantageous spring bar. The vehicle frame, axle, main coil springs, etc. may be identical to corresponding elements of the embodiment of FIGS. 1–4, and are identified by like reference numerals, but with the added subscript "a." These parts need not be redescribed.

The auxiliary spring in this case is embodied in a lever designated generally by the numeral 140. The lever includes a spring bar 141 whose free end engages downwardly, through resilient pad 142, on the top of axle 100a, or is otherwise connected to the axle, and an elongated casting fixture 143 fromed in one end with a socket 144 which snugly receives the opposite end portion of the spring bar. The casting fixture 143 is fulcrumed intermediate its ends on a frame supported hanger 145, and is extended from said fulcrum in the direction opposite from spring bar 141, so as to form one arm 140a of the lever 140, the other arm 140b of which comprises the spring arm or bar 141.

The hanger 145 as here shown comprises two arms 146 depending from a mounting plate 114a which is fastened against the underside of the frame member 116a by U-bolts 118a, in the manner of the embodiment of FIGS. 1–4. The fulcrum for the lever comprises a bolt passing horizontally through the arms 146, pivot apertures 143a in the casting fixture 143, and the hanger arms 146.

A post 130a, in the form of a headed bolt, as shown, extends loosely down through an aperture in mounting plate 114a, and thence through an aperture 147 in a web 148 at the free end of the fixture 143, and has below said fixture 143 a means generally designated at 146 for forming a stop shoulder to limit the range of free clockwise rotation of the lever 140 that can take place prior to the initiation of bending deflection of the spring bar 141. Preferably, and as here shown, this stop shoulder means comprises the combination of a light coil compression spring 136a on the post 130a, and an adjustable nut 134a screw threaded onto the lower end of post 130a. The combination of nut 134a and spring 136a acts as a stop to limit clockwise rotation of the lever 140 without bending of spring bar 141 when the coils of the spring 136a engage one another, i.e., when the spring bottoms out. Normally, the spring 136a assumes an expanded condition, and is strong enough to yieldingly hold the lever 140 in the position of FIG. 5, with the pad 142 on the spring bar 141 in engagement with the axle. It will be seen that if this spring 136a were not used, the nut 134a could then be elevated on post 130a until this nut would be at the elevation of the top end of the spring 136a in the spring-collapsed condition of FIG. 6. This, in fact, comprises one practice of the invention, and permits the lever 140 the necessary angle of swing, and therefore the main suspension springs 140 the necessary range of downward deflection, without the auxiliary spring device coming into play. However, the spring 136a is useful to hold the auxiliary spring lever 140 against looseness and rattling, and, normally, yieldingly in the position of FIG. 5, and its use is therefore preferred. Clearly, however, it is not essential, and has no requisite spring suspension function. It is so light and of such low spring constant as to have no effect on the characteristics of the "ride" that is noticeable to the passengers of the vehicle, and thus, in this respect, is an indifferent element in the spring suspension system.

Directing attention now to the spring bar 141, the butt end thereof is preferably locked in place in the casting 143 by a bolt or pin 160 inserted transversely through the casting, so as to enter an aligned notch 161 in one side of the spring bar 141. The portion of the spring bar 141 that enters socket 144 is preferably round in cross-section (FIG. 7), and the bar is progressively flattened and widened from just outside this socket to its free extremity, as may be understood from FIGS. 5, 9, 10 and 11. Thereby the bar is of progressively increasing flexibility toward its extremity, affording a better flexure action, analogous to that obtained with a conventional multiple leaf spring. Additionally, the spring bar may be formed with a downward offset as at 165 in order to clear the muffler, not shown, of the automobile.

The helper spring functions essentially in a manner equivalent to that of FIGS. 1–4. With no or light load, the vehicle frame and the spring lever 140 may assume a position such as shown in FIG. 5. The effect of the coil spring 136a on the springing of the vehicle is negligible, and it serves at this time only to hold the lever 140 yieldingly against the axle. The situation is not changed, with increased loading (but within the normal range), until the vehicle frame has been lowered almost to the position of FIG. 4, at which time the lever arm 140a has fully compressed the stop spring 136a, at which point pivotal action of the lever 140 is limited or stopped, and beyond which the spring bar flexes upwardly with still further increase in loading to bring the helper spring action into play. As in the first embodiment, the spring 136a could be omitted, if it were not desirable to restrain the lever 140 against rattling. In such case, of course, the nut 134a would be positioned properly to function as the abutment means, and for this purpose would be located with its top surface where the top end of the fully compressed spring 136a would otherwise be located.

Thus a normal soft ride is experienced with ordinary or normal loading, with no stiffening effect by the helper spring 141, and nothing but negligible effect on the ride contributed by the light anti-rattle spring 136a. With an overload, on the other hand, the vehicle frame lowers until the lever 140 is in engagement at one end with the axle, and at the other with the top end of the fully compressed coil spring 136a, and, further, until the lever fulcrum point on the frame is then still further lowered so that the spring arm is forced into flexure.

It will be further evident that in both forms of the invention, a feature of adjustability is provided, in that with increasing overloads, the nuts 136a can be progressively raised on the posts 130a, thus bringing the helper spring action into play sooner in the case of heavy overloads, and leaving more range of working deflection of the suspension springs 104a while aided by the helper springs.

It can also be seen that the device of the invention can be used to level the vehicle in the event that the main spring on one side has become weakened. This is accomplished simply by raising the nut 136, or 136a, somewhat higher on the side of the weakened main suspension spring.

Attention is finally directed to the fact that post 131a, in the form of a headed bolt, is capable of swinging somewhat as the lever 140 swings from the position of FIG. 5 to that of FIG. 6, and is thus protected against the possibility of being broken off.

While certain presently preferred embodiments of the invention have been disclosed for illustrative purposes, it will be readily apparent that numerous modifications in the design and arrangement of parts of the invention are possible within the scope of the following claims.

I claim:
1. For use on an automotive vehicle including an axle, a frame over said axle, and a main spring suspension supporting said frame on said axle, an auxiliary overload spring device comprising:
   a lever below the frame supported at one end by said axle,
   fulcrum means pivotally supporting an intermediate portion of said lever on said frame for pivoting of the lever to swing in a vertical plane, said lever from said fulcrum means to said axle comprising a spring arm of said lever,
   an abutment means supported on said frame and positioned and arranged thereon underneath the extremity of the other arm of said lever for engagement by the extremity of said other arm of said lever and establishing a limiting position for pivotal movement of said other arm at the end of a predetermined range of pivotal movement of said lever corresponding to a predetermined range of increasing loading of said vehicle and consequent lowering of said frame and said fulcrum means, such that said spring arm of said lever has a range of pivotal movement without flexure, but beyond which, with still further increase in loading of said vehicle, corresponding further lowering of said fulcrum means holds the extremity of said other arm of said lever against said abutment means in said limiting position and the extremity of said spring arm by said axle while flexing said spring arm, said abutment means including a soft coil compression spring, of greatly lower spring constant than that of said spring arm, and
   means supporting the bottom of said coil spring from said frame, with the upper end of said spring engaged downwardly by the extremity of said other arm of said lever throughout said range of pivotal movement of said lever.

2. The subject matter of claim 1, wherein said lever comprises:
   an elongated mounting fixture having pivot means near one end thereof for pivotally mounting it at said fulcrum means,
   a spring bar connected to said end of said mounting fixture to form said spring arm of said lever, and said fixture extending from said pivot means oppositely to said spring arm to form the other arm of said lever.

3. The subject matter of claim 1, wherein said lever comprises a leaf type spring.

4. The subject matter of claim 1, including also:

a support for said abutment means embodying a post with means for mounting it on the vehicle frame in a position depending therefrom, said post extending loosely through a hole in said extremity of said other arm, and thence through said coil spring, and said means supporting the bottom of said coil spring including a spring-engaging shoulder on the lower extremity of said post.

References Cited by the Examiner

UNITED STATES PATENTS

| 1,436,803 | 11/1922 | Howe | 267—45 |
| 1,506,039 | 8/1924 | Baker | 267—45 |
| 1,569,169 | 1/1926 | Border | 267—28 |
| 1,651,373 | 12/1927 | Chambers | 267—17 |
| 1,922,781 | 2/1933 | Rogers et al. | 267—45 |
| 2,013,356 | 9/1935 | Mechler et al. | 267—17 |

FOREIGN PATENTS 574,094   3/1924   France.

ARTHUR L. LA POINT, *Primary Examiner.*

R. M. WOHLFARTH, *Assistant Examiner.*